United States Patent [19]

Groenebaum et al.

[11] 4,228,603
[45] Oct. 21, 1980

[54] APPARATUS FOR FOLDING OVER AND PRESSING INTO POSITION THE EDGE STRIPS OF TWO MATERIAL WEBS

[75] Inventors: Theo Groenebaum; Hans-Heinrich Kuper, both of Rietberg, Fed. Rep. of Germany

[73] Assignee: Firma Heinrich Kuper, Fed. Rep. of Germany

[21] Appl. No.: 2,015

[22] Filed: Jan. 8, 1979

[30] Foreign Application Priority Data

Jan. 14, 1978 [DE] Fed. Rep. of Germany ........ 2801569

[51] Int. Cl.² ............................................ D06F 69/00
[52] U.S. Cl. ..................................... 38/1 B; 112/147
[58] Field of Search .................. 38/1 B, 52; 223/37; 112/147, 217

[56] References Cited

U.S. PATENT DOCUMENTS

| 651,424 | 6/1900 | McCarter | 38/1 B |
| 2,625,126 | 1/1953 | Herman | 112/147 |
| 3,990,163 | 11/1976 | Aulich et al. | 38/1 B |

Primary Examiner—Louis Rimrodt
Attorney, Agent, or Firm—Steinberg & Blake

[57] ABSTRACT

There is disclosed an apparatus for folding over and pressing into position the edge strips of two material webs, stitched together along the seam, with two collaborating feeding and pressing devices, in which one of said feeding and pressing devices is in the form of a roller and is assembled from two cylindrical jacket members of identical size, which make contact with their inside facing and surfaces with reference to said roller in a common plane and which are radially displaceable relative to each other.

9 Claims, 4 Drawing Figures

APPARATUS FOR FOLDING OVER AND PRESSING INTO POSITION THE EDGE STRIPS OF TWO MATERIAL WEBS

BACKGROUND OF THE INVENTION

The present invention relates to an apparatus for folding over and pressing into position the edge strips of two material webs stitched or sewn together along the seam with two co-operating feeding and pressing devices.

Such an apparatus is used for completing the connecting operation of two material webs of a varying kind. The material, for example, may be a textile material, leather, synthetic leather, plastics material, paper, cardboard or a wood material or the like. The two material webs to be joined together arrive in an already sewn together state into the apparatus, but their edge strips, which protrude substantially at right angles, have yet to be folded over and be adhesively connected to the associated material web. For this purpose the apparatus of the kind mentioned above is used.

It has been proved adverse with this apparatus to fold over and press into position two material webs of varying thickness. When the feeding and pressing devices have contact with the material webs along a continuous line, then with material webs of varying thickness, only the thicker material web is impacted by the feeding and pressing devices. An effective pressing into position of the edge strip of the thinner material web against their surfaces is not possible with such feeding and pressing devices, so that the required firm and clean connection and securing of the material webs and their edge strips cannot be obtained.

SUMMARY OF THE INVENTION

The object of the invention is to develop the apparatus to such an extent that every edge strip of two material webs of varying thickness sewn together may be satisfactorily folded over and by pressing into position may be connected to its associated material web surface.

In accordance with the invention it is proposed for one of the feeding and pressing devices to be in the form of a roller and assembled from two cylindrical jacket members of identical size which make contact with their facing inside strips with reference to the roller on a common plane and which are radially displaceable relative to one another.

A preferable feature is that the jacket members, at their external end faces, are retained axially by two lateral end plates which are securely connected to the shaft of the roller. These lateral end plates are secured to the shaft preferably by means of clamping or tension pins which are each inserted in a common radial bore of shaft and end plate.

Radial grooves are preferably machined in each lateral end plate on its outer circumference, into which grooves cams axially secured to the associated jacket member project, whereby a spacing determining the axial displaceability of the jacket member is retained between the grooves and the cams. The cams are preferably the outer ends of the engaging pins, which are inserted in bores parallel to the rotary axis of the roller.

It is preferable for the jacket members to be provided with internal cavities through which the shaft extends. The shaft is thus preferably connected to the jacket members via pivotable balance beams, each balance beam, in its central region, being in punctiform contact with the shaft and in its end regions with the jacket members. Hence, on the shaft in the region of the common plane of the jacket members a bead, preferably extending in circumferential direction is formed, on which bead the inside contact points of the balance beam are located, whilst each jacket member is also provided with a bead extending on its inside surface in a circumferential direction and on which the outer contact points of the balance beam are located.

The shaft is preferably provided with a driving wheel mounted thereon, where it is secured by a radial bracing pin.

BRIEF DESCRIPTION OF THE DRAWINGS.

The present invention will be further illustrated by way of example, with reference to the accompanying drawings, in which.

DESCRIPTION OF PREFERRED EMBODIMENTS

Figure 1:
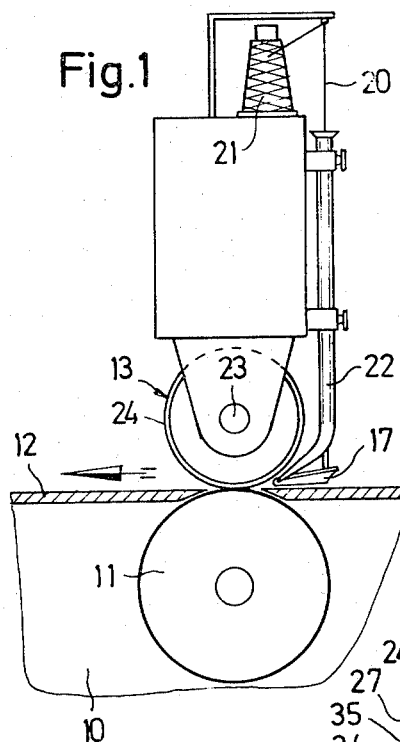
FIG. 1 is a side view of an apparatus in accordance with the invention.
Figure 3:
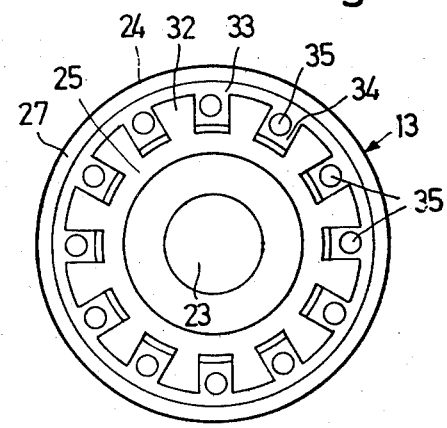
FIG. 3 is a view of the roller taken in the direction of the arrow III of FIG. 2.
Figure 2:
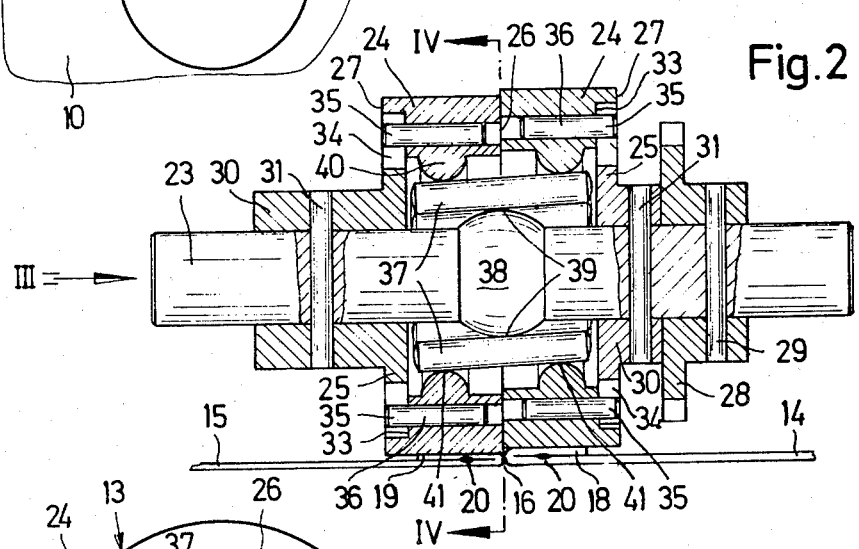
FIG. 2 is a section through a roller of such apparatus which acts on the edge strips of two material webs stitched together.
Figure 4:
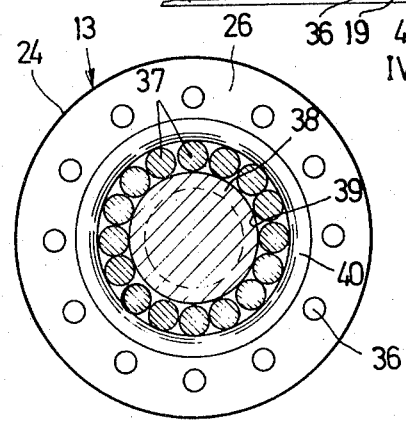
FIG. 4 is a section through the roller taken on the line IV—IV of FIG. 2.

The apparatus in accordance with the invention comprises two co-operating feeding and pressing devices which are located on a frame 10. The lower feeding and pressing device is in the form of a roller 11 and is mounted below a support surface 12, whilst the other feeding and pressing device is in the form of a roller 13 and is mounted above the support surface 12. Two material webs 14 and 15 which have a common seam 16 move in the direction of the arrow shown in FIG. 1 during the processing operation. They first arrive at a folding device 17, which effects the folding over of their edge strips 18 and 19, and are joined together by the prior insertion of an adhesive thread 20 between the edge strip 18 and the material web 14 and an adhesive thread 20 between the edge strip 19 and the material web 15. The adhesive thread 20 is unwound from a spool 21 and on its way to the folding device 17 may pass through a heating device 22 where its adhesive is activated. The adhesive threads 20 are also shown in FIG. 2 of the drawings, which also shows the stitched together material webs 14 and 15.

The roller 13 in accordance with the invention is secured to a shaft 23. It contains two identically fashioned jacket members 24 and two lateral end plates 25. Each jacket member 24 is made as a body having a circular cylindrical outer surface which is internally hollow. They are located side by side so that they make contact with each other at their end faces. These internal end faces 26, with reference to the roller 13, are located in a common defining plane of both jacket members 24. The other end face of each jacket member forms an external end face 27 of the roller 13.

The shaft 23 extends through the common cavity of the jacket members 24. Outside the jacket members 24 on the shaft 23 a driving wheel 28, for example, a gearwheel, is mounted and secured thereto by means of a pin 29 which is inserted through a common bore of the body of the driving wheel 28 and shaft 23. In the region of the external end faces 27, the shaft 23 is connected to the jacket members 24 via lateral end plates 25, which with their cylindrical end plates 30, are mounted on the shaft 23 and securely connected to the shaft 23 with pins 31. These pins 31 extend like the pins 29 radially with reference to the shaft 23, each pin 31 is inserted in a bore common to the shaft 23 and the associated end plate 30. Thus there is a rigid connection from the driving wheel 28 to the lateral end plates 25.

The lateral end plates 25, with their outer circumferential region 32, axially abut the supporting surfaces 33, which are machines in the jacket members 24 from their outer end faces 27. Any axial displacement of the jacket members 24 relative to the shaft 23 is therefore impossible. In the outer circumferential region 32, each lateral end plate 25 has several radial grooves 34 machined therein. They serve to receive axial cams 35 which project from the abutment surfaces 33 of the jacket members 24. The cams 35 are the outer ends of engaging pins 36 which are inserted in the jacket members 24 into axial bores. A radial spacing is provided between each cam and the associated groove 34. The jacket members therefore are able to move in a radial direction relative to the shaft 23 to such an extent until the defining edge of a groove 34 strikes against the cam 35. Since each jacket member 24 has its own lateral end plates 25, the two jacket members 24 may be mutually displaced in a radial direction. Rotation of the shaft 23 causes the defining edges of the grooves 34 to abut against the associated cams 35 in a circumferential direction, so that the rotary movement is transmitted by the shaft 23 to the jacket members 24.

For uniformly pressing the two jacket members 24 against the edge strips 18 or 19 of the material webs 14 or 15, which may be effected by means of an adjustable spring which, however, is not shown, it is first necessary for the seam 16 to be located in the plane of the inside end faces 16, thus each edge strip 18 or 19 being provided with its own jacket member. Moreover, adjustment of the pressure application forces is necessary when the material webs 14 and 15 vary in thickness. This adjustment is effected by means of balance beams 37. In the region of the plane of the end faces 26, the shaft 23 is provided with a bead 38 which has an outwardly curved surface. Several balance beams 37 abut thereagainst in the circumferential direction. They contact the bead 38 therefore with their central region at points of contact 39. In the region of their ends, the balance beams 37 abut against beads 40 which, at the inside surfaces of the jacket members, are formed in their cavities and, with the balance beams 37, form common points of contact 41.

If two stitched together material webs 14 and 15 of varying thickness are moved with their edge strips 18 and 19 into the apparatus, then with the aid of the balance beams 37 an automatic adjustment of the pressure application forces on the edge strips 18 and 19, to be applied by the jacket members 24, occurs. At the thicker material web 14, the jacket member 24 is pressed upwardly. Hence also its bead 40 is also moved upwardly. The end of the balance beam 37, above the material web 15 projecting into the adjacent jacket member 24, now has to move forcibly downwards, whereby it presses the jacket member 24 via the contact point 41 on the bead 40 downwardly onto the edge strip 19 of the thinner material web 15. In this manner, therefore, the same forces are transmitted to the edge strip 18 to be adhesively connected to material web 14 and on the edge strip 19 to be adhesively connected to the material web 15.

The feeding and pressing device 11 need not necessarily be formed as a roller. Instead of the roller, for example, a pressing shoe, a conveyor belt or the like may be used.

We claim:

1. An apparatus for folding over and pressing into position the edge strips of two material webs, stitched together along the seam, comprising two co-operating superposed feeding and pressing devices, one of said feeding and pressing devices including two cylindrical jacket members of substantially identical size, which members are radially displaceably mounted relative to each other and, at their respective outer end faces are axially retained by two respective lateral end plates, in which radial grooves are machined in each lateral end plate at its outer circumference, into which grooves axial cams secured to a respective one of the associated jacket members project, whereby a spacing is maintained between the grooves and the cams, which spacing determines the radial displaceability of the jacket member.

2. An apparatus as recited in claim 1, in which the cams comprise the outer ends of engaging pins which are inserted in bores which extend parallel to the axis of rotation of the jacket member.

3. An apparatus as recited in claim 1, in which the jacket members include inwardly facing end faces which are in mutual contact in a common plane.

4. An apparatus as recited in claim 3, in which the lateral end plates are secured to a shaft common to both jacket members by means of clamping pins which are inserted in a common radial bore of the shaft and associated end plates.

5. An apparatus as recited in claim 4, in which said jacket members are provided with internal cavities through which said shaft extends.

6. An apparatus as recited in claim 5, in which said shaft is connected to the jacket members by means of pivotable balance beams, whereby each balance beam in its central region is in punctiform contact with the shaft and in its end regions with the jacket members.

7. An apparatus recited in claim 6, in which a circumferentially extending bead is formed on said shaft in the region of the common plane of said jacket members, on which bead the inside points of contact of the balance beams are located.

8. An apparatus as recited in claim 7, in which each jacket member is provided with a bead circumferentially extending on its inner surface on which the outer contact points of the balance beams are located.

9. An apparatus as recited in claim 8, in which the shaft has a driving wheel mounted thereon where it is secured by means of a radial clamping pin.

* * * * *